(12) United States Patent
Mochida

(10) Patent No.: US 10,900,636 B2
(45) Date of Patent: Jan. 26, 2021

(54) LIGHT FLUX CONTROL MEMBER, LIGHT-EMITTING DEVICE, SURFACE LIGHT SOURCE DEVICE AND DISPLAY DEVICE

(71) Applicant: Enplas Corporation, Saitama (JP)

(72) Inventor: Toshihiko Mochida, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 16/605,824

(22) PCT Filed: Apr. 19, 2018

(86) PCT No.: PCT/JP2018/016106
§ 371 (c)(1),
(2) Date: Oct. 17, 2019

(87) PCT Pub. No.: WO2018/194118
PCT Pub. Date: Oct. 25, 2018

(65) Prior Publication Data
US 2020/0141557 A1   May 7, 2020

(30) Foreign Application Priority Data
Apr. 19, 2017   (JP) ................................. 2017-082820

(51) Int. Cl.
*F21V 5/04* (2006.01)
*F21V 8/00* (2006.01)
*G06F 1/16* (2006.01)

(52) U.S. Cl.
CPC ............ *F21V 5/045* (2013.01); *G02B 6/0078* (2013.01); *G06F 1/1609* (2013.01)

(58) Field of Classification Search
None
See application file for complete search history.

(56) References Cited

U.S. PATENT DOCUMENTS

| 10,393,343 B2 * | 8/2019 | Mochida | ................... | F21V 3/02 |
| 2009/0116245 A1 * | 5/2009 | Yamaguchi | .............. | G02B 3/04 |
| | | | | 362/311.01 |

(Continued)

FOREIGN PATENT DOCUMENTS

| JP | 2010-272527 | 12/2010 |
| JP | 2011-023204 | 2/2011 |

(Continued)

OTHER PUBLICATIONS

International Search Report and the Written Opinion dated Jul. 10, 2018 From the International Searching Authority Re. Application No. PCT/JP2018/016106. (9 Pages).

*Primary Examiner* — Britt D Hanley

(57) ABSTRACT

This light flux control member comprises an incidence surface, an emission surface, and a plurality of protruding strips. The plurality of protruding strips are disposed approximately perpendicularly to a central axis. When the section perpendicular to the central axis of the incidence surface has the shape of an ellipse, at least some of the plurality of protruding strips are disposed outside a recessed part in the minor axis direction of the ellipse and along the minor axis direction. When the section of the emission surface has the shape of an ellipse, at least some of the plurality of protruding strips are disposed outside the recessed part in the major axis direction of the ellipse and along the major axis direction.

7 Claims, 19 Drawing Sheets

(56) References Cited

U.S. PATENT DOCUMENTS

| | | | |
|---|---|---|---|
| 2010/0302785 A1 | 12/2010 | Zhou | |
| 2014/0168999 A1* | 6/2014 | Li | F21V 5/045 |
| | | | 362/338 |
| 2015/0260371 A1* | 9/2015 | Takatori | F21V 13/02 |
| | | | 362/97.1 |
| 2018/0188608 A1* | 7/2018 | Fujii | G02B 3/00 |
| 2020/0012153 A1* | 1/2020 | Momoi | F21V 5/00 |

FOREIGN PATENT DOCUMENTS

| | | |
|---|---|---|
| JP | 2016-127030 | 7/2016 |
| JP | 2017-050246 | 3/2017 |
| WO | WO 2018/194118 | 10/2018 |

* cited by examiner

LIGHT FLUX CONTROL MEMBER, LIGHT-EMITTING DEVICE, SURFACE LIGHT SOURCE DEVICE AND DISPLAY DEVICE

RELATED APPLICATIONS

This application is a National Phase of PCT Patent Application No. PCT/JP2018/016106 having International filing date of Apr. 19, 2018, which claims the benefit of priority of Japanese Patent Application No. 2017-082820 filed on Apr. 19, 2017. The contents of the above applications are all incorporated by reference as if fully set forth herein in their entirety.

FIELD AND BACKGROUND OF THE INVENTION

The present invention relates to a light flux controlling member that controls a distribution of light emitted from a light emitting element, and to a light-emitting device, a surface light source device and a display device including the light flux controlling member.

Some transmitting image display apparatuses such as liquid crystal display apparatuses use a direct surface light source device as a backlight. In recent years, direct surface light source devices including a plurality of light emitting elements as the light source have been used.

For example, a direct surface light source device includes a substrate, a plurality of light emitting elements, a plurality of light flux controlling members (lenses) and a light diffusion member. Each of the light emitting elements is, for example, a light-emitting diode (LED) such as a white light-emitting diode. The light emitting elements are disposed on the substrate in a matrix. The light flux controlling member that spreads the light of the light emitting element in the plane direction of the substrate is disposed over each light emitting element. The light emitted from the light flux controlling member is diffused by the light diffusion member so as to illuminate an illumination target member (e.g., a liquid crystal panel) in a planar fashion.

FIGS. 1A to 1C illustrate a configuration of a conventional light flux controlling member. FIG. 1A is a perspective view as viewed from a rear side, FIG. 1B is a perspective view illustrating a cross-section as viewed from a rear side, and FIG. 1C is a sectional view. Note that, in FIGS. 1A and 1B, a leg part disposed on the rear side is omitted. As illustrated in FIGS. 1A to 1C, conventional light flux controlling member 20 includes incidence surface 22 and emission surface 24. Incidence surface 22 is an inner surface of a first recess that is formed on the rear surface and disposed opposite to a light-emitting element. Incidence surface 22 allows incidence of light emitted from light-emitting element. Emission surface 24 is disposed on the side opposite to incidence surface 22, and configured to emit, to the outside, light incident on incidence surface 22.

FIGS. 2A and 2B are light path diagrams of light flux controlling member 20. FIG. 2A is a light path diagram of light beams emitted from a center of a light emission surface of light emitting element 10 at an emission angle of 30°, and FIG. 2B is a light path diagram of light beams emitted from a center of a light emission surface of light emitting element 10 at an emission angle of 40°. Here, the "emission angle" is an angle (θ in FIG. 2A) of a light beam to optical axis OA of light emitting element 10. Note that the leg part disposed on the rear side is omitted in FIGS. 2A and 2B.

As illustrated in FIGS. 2A and 2B, light emitted from light emitting element 10 enters light flux controlling member 20 from incidence surface 22. The light entering light flux controlling member 20 reaches emission surface 24. A large part of the light reaching emission surface 24 is emitted to the outside from emission surface 24 (solid line arrow). At this time, when emitted from emission surface 24, the light is refracted by emission surface 24, while the travelling direction thereof is controlled. On the other hand, another part of the light reaching emission surface 24 is reflected by light emission surface 24 (fresnel reflection), and reaches rear surface 26 (broken line arrow). When a part of the light reaching rear surface 26 is internally reflected at rear surface 26, the quantity of the light travelling toward a portion immediately above light flux controlling member 20 is excessively increased, and consequently non-uniform luminance distribution (luminance unevenness) of the light applied from the light-emitting device is caused. In addition, when the light having reached rear surface 26 is emitted from rear surface 26, a part of the emitted light is absorbed by the substrate, thus reducing the use efficiency of the light, and another part of the emitted light is reflected by the substrate as uncontrollable light, thus reducing the light distribution characteristics. In view of this, PTL 1 proposes a light flux controlling member for solving the above-mentioned problems.

FIGS. 3A to 3C illustrate a configuration of light flux controlling member 30 disclosed in PTL 1. FIG. 3A is a perspective view as viewed from a rear side, FIG. 3B is a perspective view illustrating a cross section as viewed from a rear side, and FIG. 3C is a sectional view. Note that the leg part disposed on the rear side is omitted in FIGS. 3A and 3B. As illustrated in FIGS. 3A to 3C, in light flux controlling member 30 disclosed in PTL 1, a second recess is formed on rear surface 26. The second recess includes inclined surface 32 disposed on the outer side, and surface 34 disposed on the inner side in substantially parallel to central axis CA. Inclined surface 32 is rotationally symmetrical (circularly symmetrical) about central axis CA of light flux controlling member 30, and is tilted at a predetermined angle (e.g.,) 45° to a virtual straight-line orthogonal to central axis CA.

FIGS. 4A and 4B are light path diagrams of light flux controlling member 30. FIG. 4A is a light path diagram of light beams emitted from a center of a light emission surface of light emitting element 10 at an emission angle of 30°, and FIG. 4B is a light path diagram of light beams emitted from a center of a light emission surface of light emitting element 10 at an emission angle of 40°. Note that the leg part disposed on the rear side is omitted also in FIGS. 4A and 4B. As illustrated in FIGS. 4A and 4B, light internally reflected at emission surface 24 reaches a predetermined portion of rear surface 26. By forming inclined surface 32 in the above-mentioned predetermined region, it is possible to reflect at least a part of the light reaching inclined surface 32 toward the light lateral direction.

In this manner, in light flux controlling member 30 disclosed in PTL 1, light internally reflected at emission surface 24 is not easily directed toward a portion immediately above light flux controlling member 30, and is not easily absorbed by the substrate. Accordingly, a light-emitting device having light flux controlling member 30 disclosed in PTL 1 can uniformly and efficiently emit light in comparison with a conventional light-emitting device having light flux controlling member 20.

In addition, in recent years, LEDs of chip-on-board (COB) type have been used as the light source of illumination apparatuses because of its ease of mounting, and its high light emission efficiency. The LEDs of COB type are known to emit a larger quantity of light also in the lateral direction in addition to the light emission in the upward direction, in comparison with conventional LEDs.

CITATION LIST

Patent Literature

PTL 1 Japanese Patent Application Laid-Open No. 2011-23204

SUMMARY OF THE INVENTION

In the case where an LED of COB type is used as the light-emitting element of the surface light source device disclosed in PTL 1, the light flux controlling member might be disposed such that the rear surface of the light flux controlling member is lower than the top surface of the light-emitting element, for the purpose of allowing a large quantity of light which is emitted in the lateral direction of the LED to enter the light flux controlling member from incidence surface 22. In this case, the light which is emitted in the lateral direction of the light-emitting element, and enters the light flux controlling member from a lower portion of the incidence surface 22 travels inside the light flux controlling member, and reaches inner surface 34 of the second recess. This light passes through inner surface 34 while, depending on the state of surface 34, being scattered. Further, most of the light passing through surface 34 is refracted by inclined surface 32, so as to travel toward a region near an upper region of the light flux controlling member (see FIG. 5). In this manner, in the case where an LED of COB type is used in the surface light source device disclosed in PTL 1, the quantity of the light travelling toward the region near the upper region of the light-emitting device is excessive due to scattering at inner surface 34 and refraction at inclined surface 32, and consequently a circular high luminance region is formed near the upper region of the light flux controlling member, thus causing luminance unevenness. In addition, even in the case where the rear surface of the light flux controlling member is disposed at a position higher than the top surface of the light-emitting element, the light incident on a part in the proximity of the outer edge of the first recess might be refracted and might reach inner surface 34 of the second recess.

An object of the present invention is to provide a light flux controlling member that less causes luminance unevenness of light emitted from the light flux controlling member even when used in combination with a light-emitting element, such as an LED of COB type, that emits light more in the lateral direction.

In addition, another object of the present invention is to provide a light-emitting device, a surface light source device and a display device including the light flux controlling member.

A light flux controlling member of an embodiment of the present invention is configured to control a distribution of light emitted from a light-emitting element, the light flux controlling member including: an incidence surface that is an inner surface of a recess disposed on a rear side so as to intersect a central axis of the light flux controlling member, the incidence surface being configured to allow incidence of the light emitted from the light-emitting element; an emission surface disposed on a front side so as to intersect the central axis, the emission surface emits, to outside, the light entered from the incidence surface; a plurality of ridges disposed on the rear side, each of the plurality of ridges including a first inclined surface, a second inclined surface and a ridgeline disposed between the first inclined surface and the second inclined surface; and the plurality of ridges is disposed such that the plurality of ridges is substantially perpendicular to the central axis.

A light-emitting device of an embodiment of the present invention includes a substrate; a light-emitting element disposed on the substrate; and the above-mentioned light flux controlling member disposed on the substrate.

A surface light source device of an embodiment of the present invention includes the above-mentioned light-emitting device; and a light diffusion member configured to allow light emitted from the light-emitting device to pass through the light diffusion member while diffusing the light.

A display device of an embodiment of the present invention includes the above-mentioned surface light source device; and a display member configured to be irradiated with light emitted from the surface light source device.

Advantageous Effects of Invention

The light flux controlling member of the present invention less causes luminance unevenness of emission light even when used in combination with a light-emitting element, such as an LED of COB type, that emits light more in the lateral direction.

In addition, with the light flux controlling member that less causes luminance unevenness, the light-emitting device, the surface light source device and the display device of an embodiment of the present invention less cause luminance unevenness of emission light.

DESCRIPTION OF SPECIFIC EMBODIMENTS OF THE INVENTION

A light flux controlling member, a light-emitting device, a surface light source device and a display device according to the present embodiment are described below with reference to the accompanying drawings. In the following description, a surface light source device suitable for a backlight of a liquid crystal display apparatus and the like is described as a typical example of the surface light source device according to the present embodiment.

Embodiment 1

Configuration of Surface Light Source Device and Light-Emitting Device

Figure 1A:
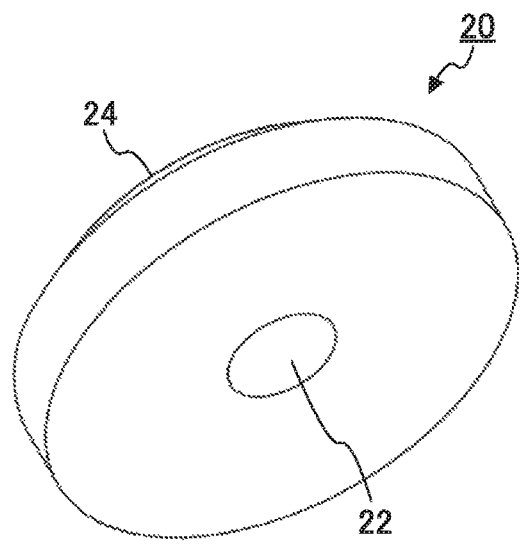
FIGS. 1A 1B and 1C illustrate a configuration of a conventional light flux controlling member.
Figure 1B:
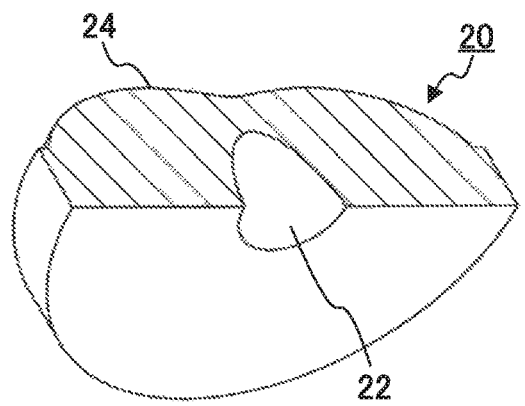
Figure 1C:
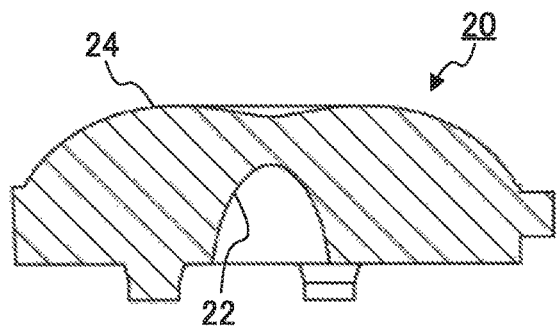
Figure 2A:
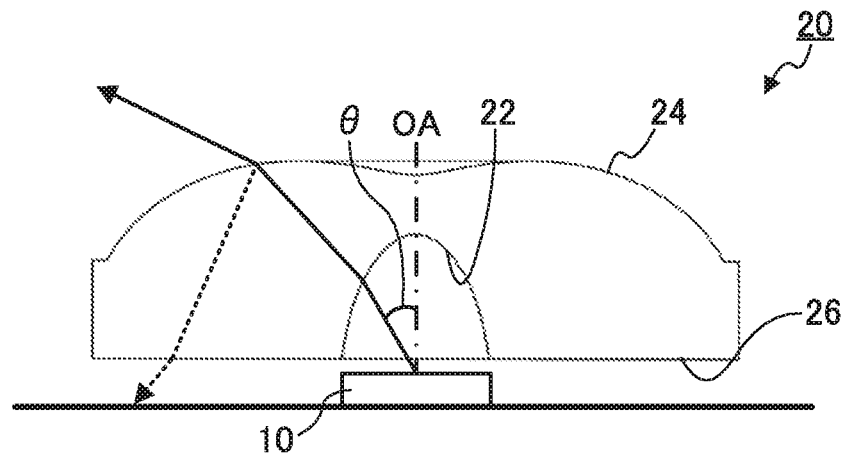
FIGS. 2A and 2B are light path diagrams of a conventional light flux controlling member.
Figure 2B:
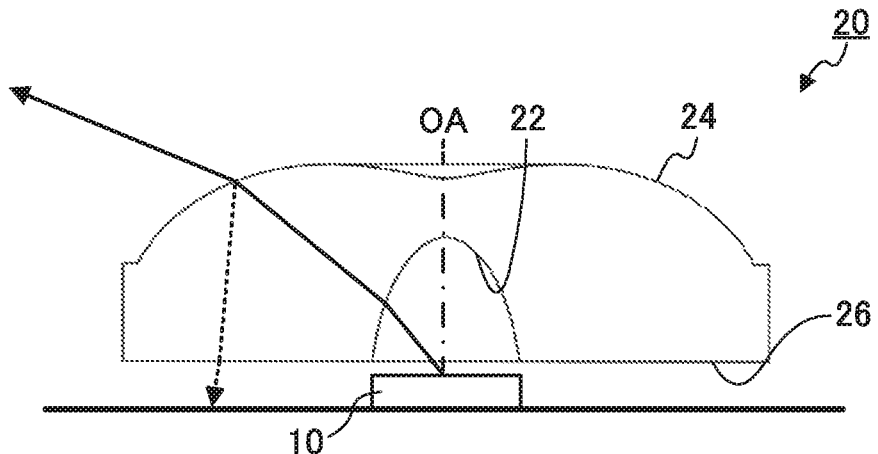
Figure 3A:
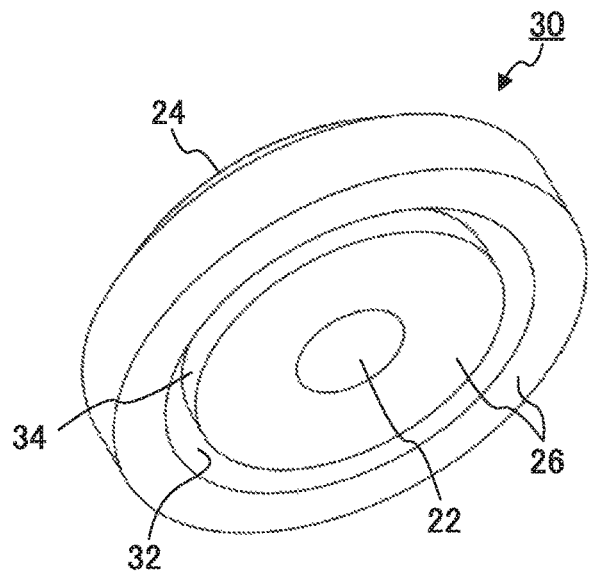
FIGS. 3A, 3B and 3C illustrate a configuration of a light flux controlling member disclosed in PTL 1.
Figure 3B:
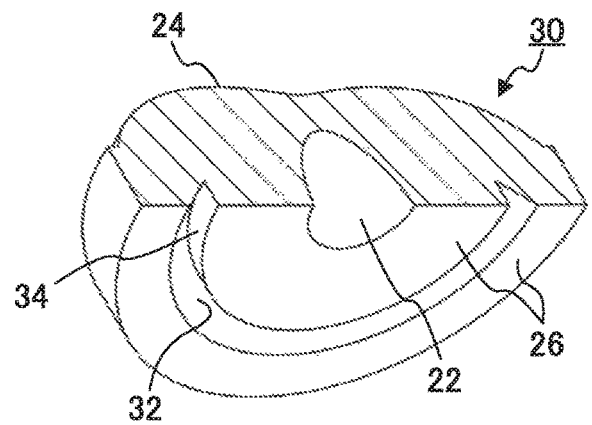
Figure 3C:
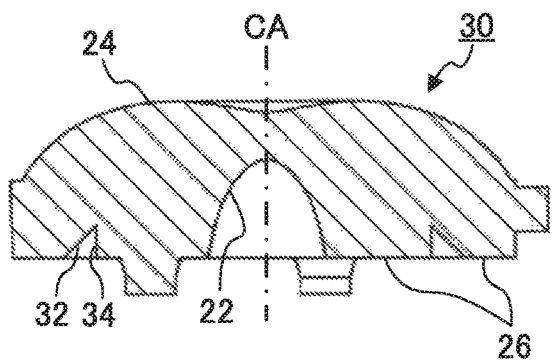
Figure 4A:
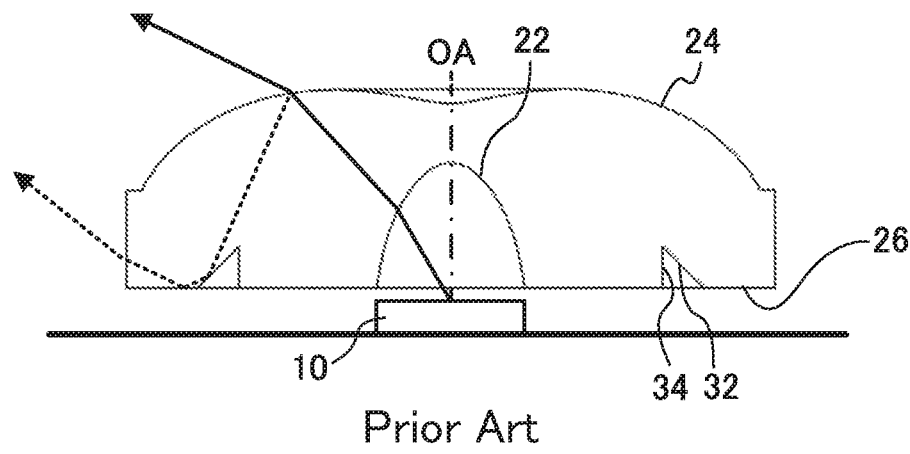
FIGS. 4A and 4B are light path diagrams of the light flux controlling member disclosed in PTL 1.
Figure 4B:
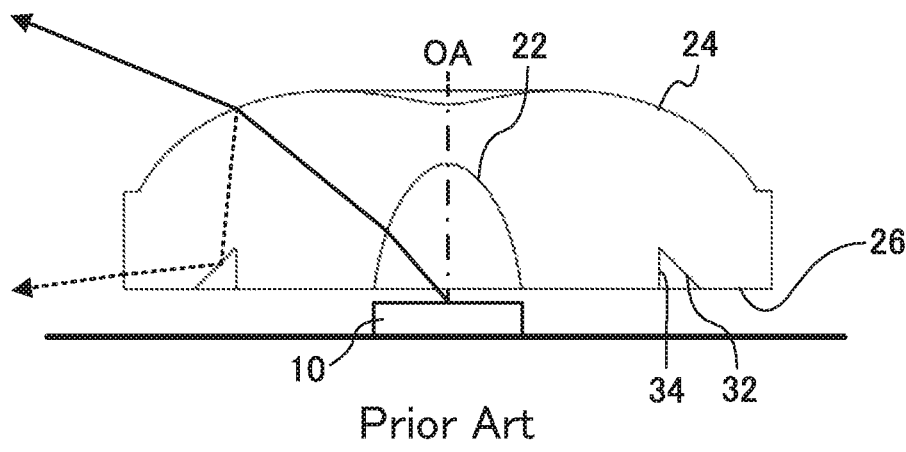
Figure 5:
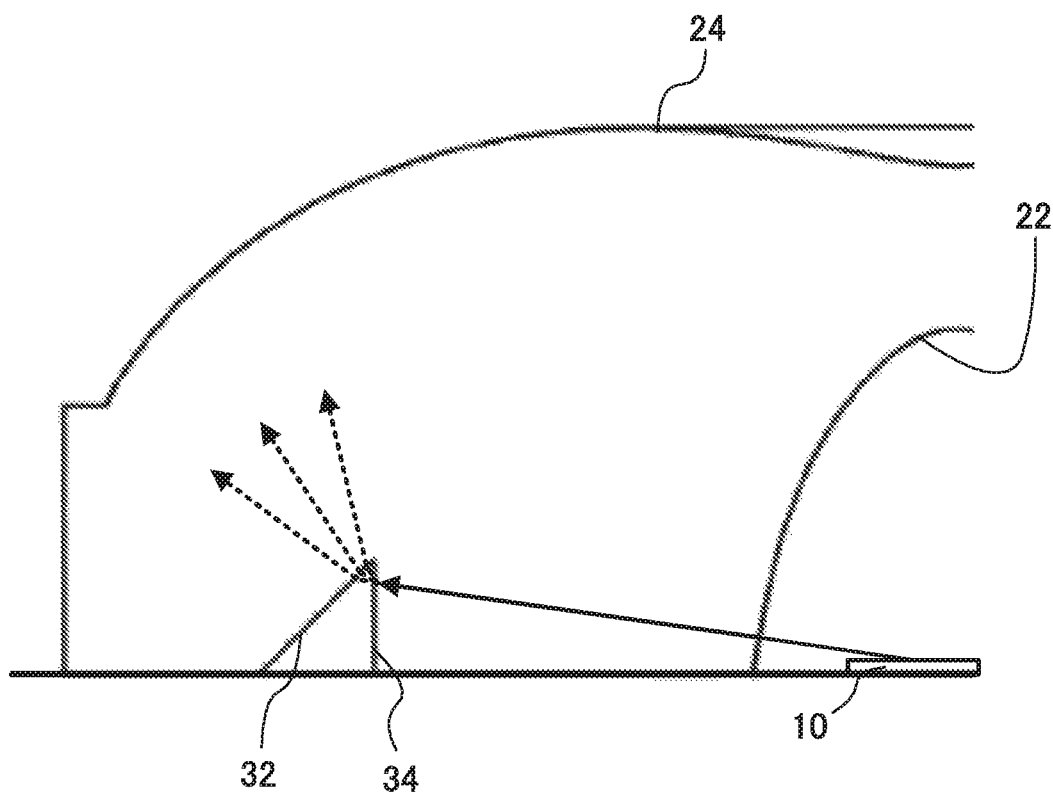
FIG. 5 is other light path diagrams of the light flux controlling member disclosed in PTL 1.
Figure 6A:
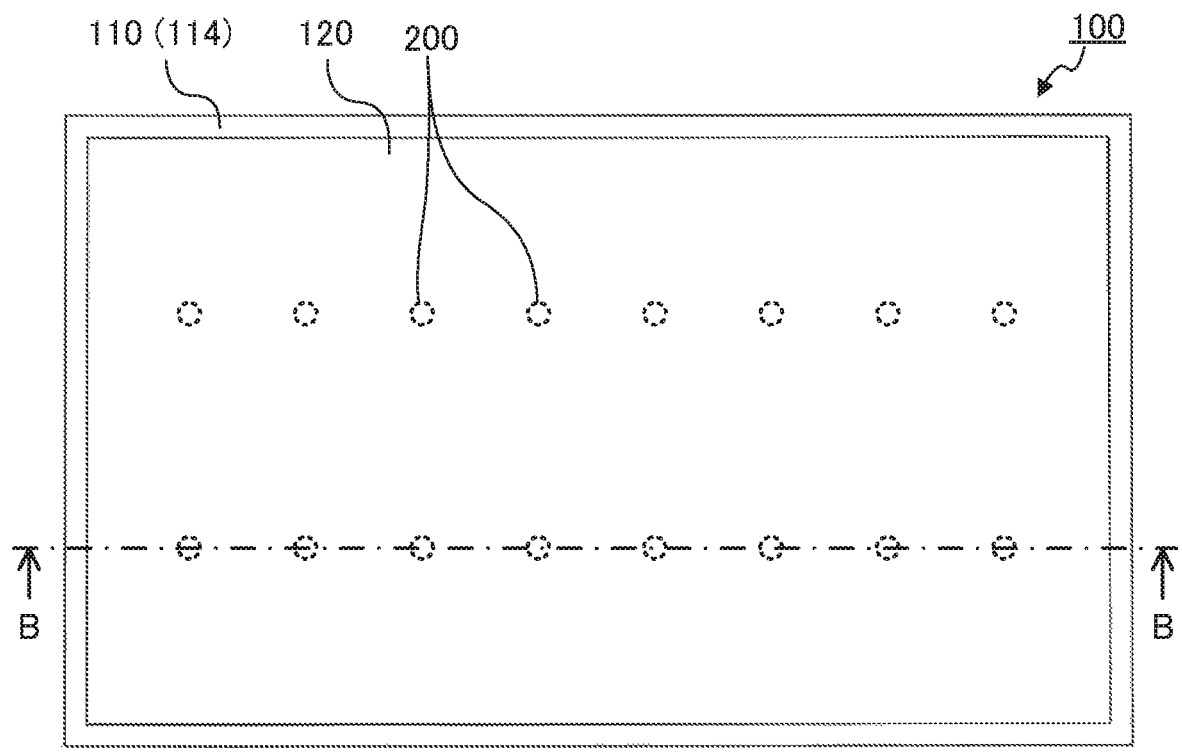
FIGS. 6A and 6B illustrate a configuration of a surface light source device according to Embodiment 1.
Figure 6B:
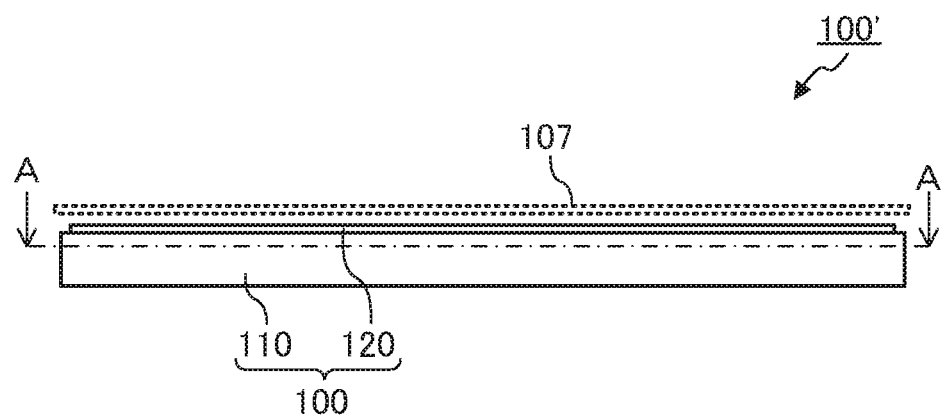
Figure 7A:
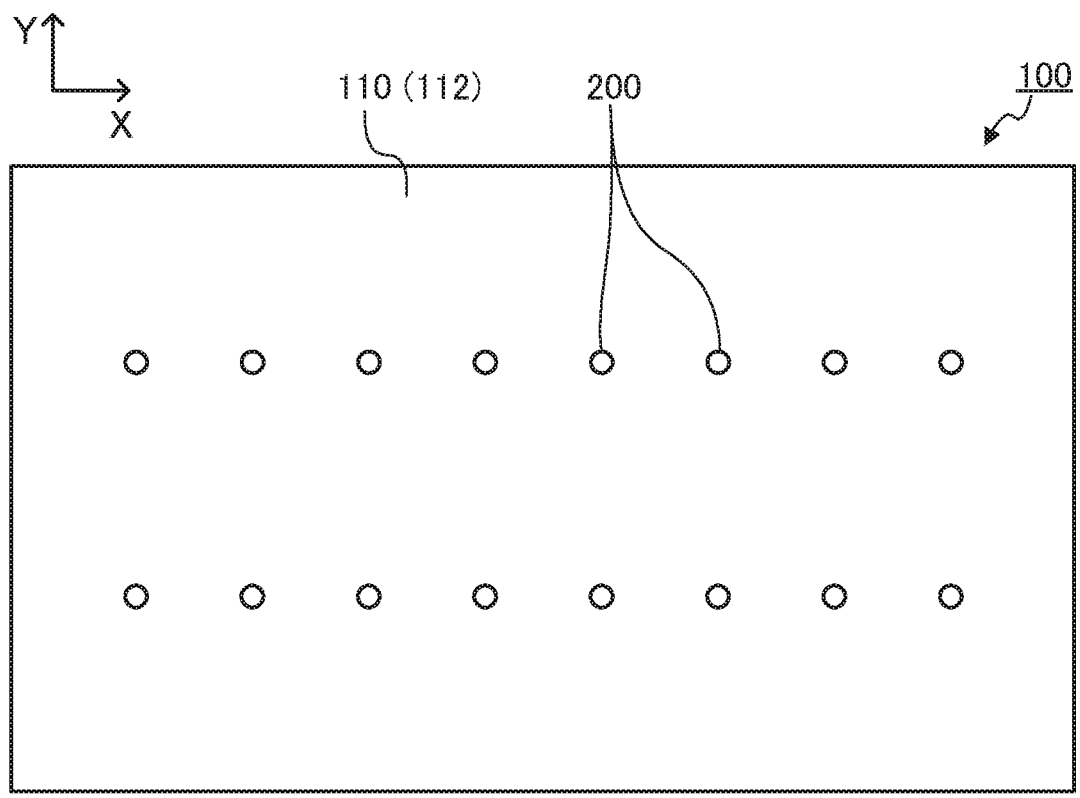
FIGS. 7A and 7B are sectional views illustrating a configuration of the surface light source device according to Embodiment 1.
Figure 7B:
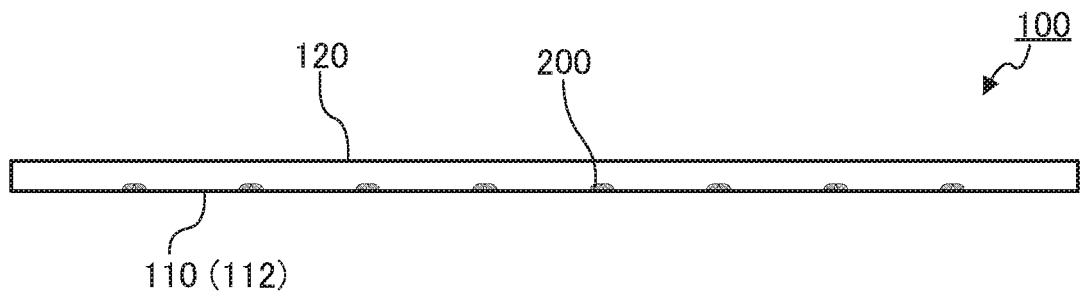
Figure 8:
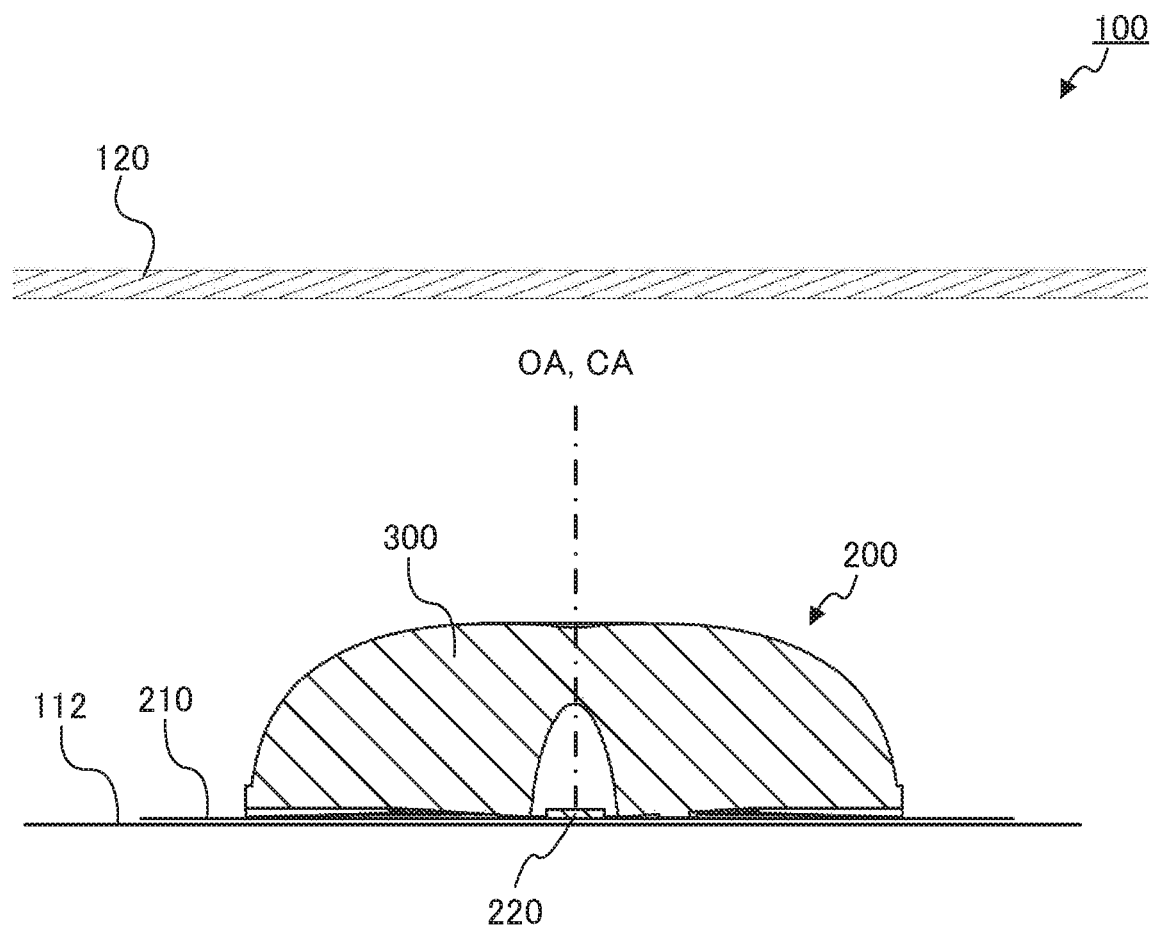
FIG. 8 is a partially enlarged sectional view of the surface light source device according to Embodiment 1.

FIGS. 6A to 8 illustrate a configuration of surface light source device 100 according to Embodiment 1. FIG. 6A is a plan view of surface light source device 100 according to Embodiment 1, and FIG. 6B is a front view of surface light source device 100. FIG. 7A is a sectional view taken along line A-A of FIG. 6B, and FIG. 7B is a sectional view taken along line B-B of FIG. 6A. FIG. 8 is a partially enlarged sectional view of surface light source device 100.

As illustrated in FIGS. 6A to 8, surface light source device 100 includes housing 110, a plurality of light-emitting devices 200, and light diffusion plate 120. Surface light source device 100 according to the present embodiment is applicable to a backlight of a liquid crystal display apparatus. In addition, as illustrated in FIG. 6B, surface light source device 100 can be used as display device 100' when combined with a display member (illumination target member) 107 (indicated with dotted line in FIG. 6B) such as a liquid crystal panel.

Light-emitting devices 200 are disposed in a matrix or in a line on bottom plate 112 of housing 110. The inner surface of bottom plate 112 functions as a diffusive reflection surface. In addition, top plate 114 of casing 110 is provided with an opening. Light diffusion plate 120 is disposed to cover the opening, and functions as a light emitting surface. The light emitting surface may have a size of, for example, approximately 400 mm×approximately 700 mm.

The ratio of the center-to-center distance (pitch) of light-emitting devices 200 in a first direction (the X direction illustrated in FIG. 7A) and the center-to-center distance (pitch) of light-emitting devices 200 in a second direction (the Y direction illustrated in FIG. 7A) orthogonal to the first direction in the case where light-emitting devices 200 are disposed in a matrix is about 1:4, for example. In the present embodiment, even when the pitch of light-emitting devices 200 in the first direction and the pitch of light-emitting devices in the second direction differ from each other as described above, the irradiation target member can be uniformly illuminated. In the case where the pitch in the first direction and the pitch in the second direction differ from each other, it is preferable that the region to be irradiated by light-emitting device 200 have a substantially elliptical shape. In this case, it is preferable that the major axis of the ellipse extend along the direction in which the pitch is larger of the first direction and the second direction. In the case where light-emitting devices 200 are disposed in a line on bottom plate 112 of housing 110, and the distance between an end of housing 110 and the center of a light-emitting device 200 in the direction orthogonal to the line of light-emitting devices 200 is greater than the distance between light-emitting devices 200 adjacent to each other, it is preferable that the major axis of the ellipse extend along the direction orthogonal to the line of light-emitting devices 200.

Each light-emitting device 200 is fixed at a predetermined position on bottom plate 112 of housing 110. As illustrated in FIG. 8, each light-emitting device 200 includes substrate 210, light-emitting element 220 and light flux controlling member 300.

Substrate 210 is a plate-shaped member that supports light-emitting element 220 and light flux controlling member 300. Substrates 210 are disposed on bottom plate 112 at a predetermined interval.

Light emitting element 220 is the light source of surface light source device 100, and is disposed on substrate 210. Light emitting element 220 is a light-emitting diode (LED) such as a white light-emitting diode, for example. Preferably, in the present embodiment, light emitting element 220 is an LED of chip-on-board (COB) type from the viewpoint of the ease of mounting and high light emission efficiency.

LEDs of COB type are known to emit a larger quantity of light in the lateral direction in comparison with conventional LEDs. Light-emitting element 220 of an LED of COB type or the like emits a large quantity of light in the lateral direction, and it is therefore necessary to control the light such that a larger quantity of light emitted in the lateral direction from light-emitting element 220 enters light flux controlling member 300. In view of this, it is preferable to dispose light-emitting element 220 such that the top surface of light-emitting element 220 is located on the upper side than the lower end (opening edge) of first recess 310 described later in the vertical direction.

Light flux controlling member 300 is a lens, and is fixed on substrate 210. Light flux controlling member 300 controls the distribution of light emitted from light emitting element 220, and spreads the light travelling direction in the plane direction of substrate 210. Light flux controlling member 300 is disposed over light emitting element 220 in such a manner that its central axis CA matches optical axis OA of light emitting element 220 (see FIG. 8). Note that "central axis CA of light flux controlling member 300" means a straight line passing through the rotation center of light flux controlling member 300. Note that light flux controlling member 300 according to the present embodiment is rotationally symmetric (2-fold rotational symmetric), and therefore central axis CA of light flux controlling member 300 matches the middle point of light flux controlling member 300 in the first direction and the middle point of light flux controlling member 300 in the second direction.

In addition, "optical axis OA of light emitting element" means a central light beam of a stereoscopic light flux from light emitting element 220.

Light flux controlling member 300 can be formed by integral molding. The material of light flux controlling member 300 is not limited as long as light of a desired wavelength can pass therethrough. For example, the material of light flux controlling member 100 is an optically transparent resin such as polymethylmethacrylate (PMMA), polycarbonate (PC), epoxy resin (EP) and silicone resin, or glass. A main feature of surface light source device 100 according to the present embodiment is the configuration of light flux controlling member 300. Therefore, light flux controlling member 300 will be separately described in detail.

Light diffusion plate 120 is a plate-shaped member having a light diffusing property, and allows the light emitted from light emitting device 200 to pass therethrough while diffusing the light. Light diffusion plate 120 is disposed over light emitting devices 200 with an air layer therebetween in such a manner that light diffusion plate 120 is approximately parallel to substrate 210. Normally, the size of light diffusion plate 120 is substantially the same as that of the illumination target member such as a liquid crystal panel. For example, light diffusion plate 120 is formed of an optically transparent resin such as polymethylmethacrylate (PMMA), polycarbonate (PC), polystyrene (PS), and styrene methyl methacrylate copolymerization resin (MS). In order to provide a light diffusing property, minute irregularities are formed in the surface of light diffusion plate 120, or diffusing members such as beads are dispersed in light diffusion plate 120.

In surface light source device 100 according to the embodiment of the present invention, the light emitted from each light emitting element 220 is spread by light flux controlling member 300 so as to illuminate a wide range of light diffusion plate 120. The light emitted from each light flux controlling member 300 is further diffused by light diffusion plate 120. Thus, surface light source device 100 according to the embodiment of the present invention can uniformly illuminate a planar illumination target member (e.g., a liquid crystal panel).

Configuration of Light Flux Controlling Member

Figure 9:
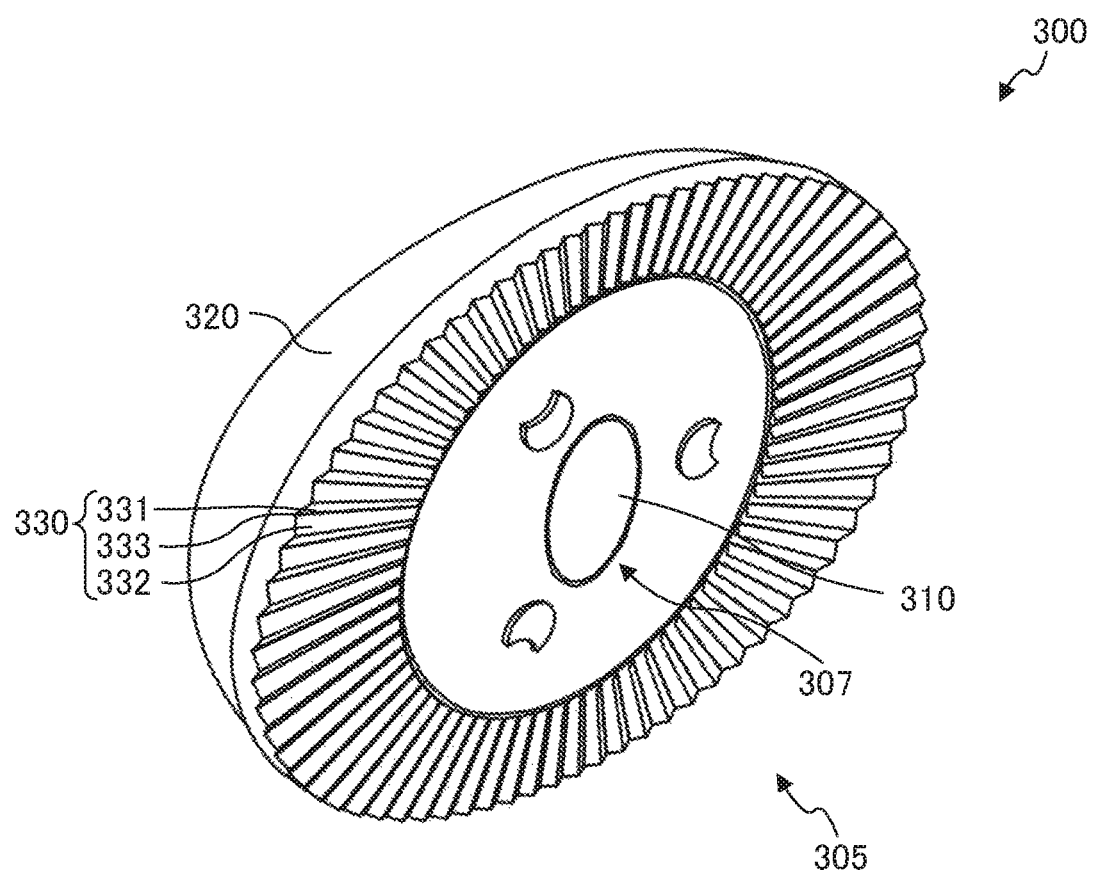
FIG. 9 is a perspective view of a light flux controlling member according to Embodiment 1 as viewed from a rear side.
Figure 10A:
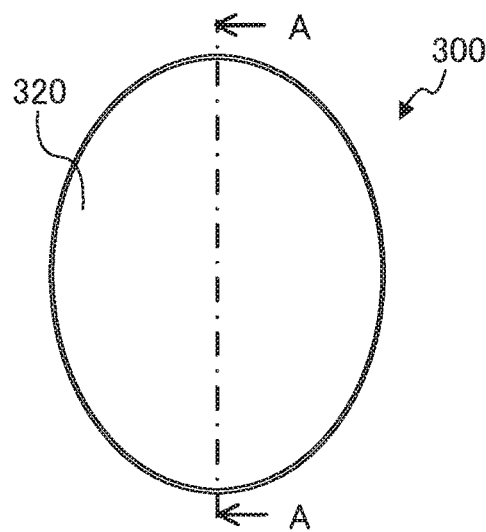
FIGS. 10A, 10B, 10C, 10D and 10E illustrate a configuration of the light flux controlling member according to Embodiment 1.
Figure 10B:
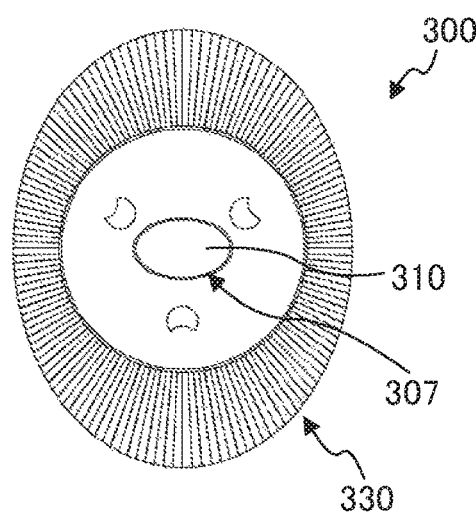
Figure 10C:
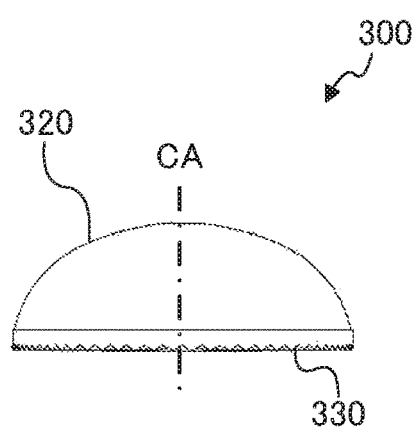
Figure 10D:
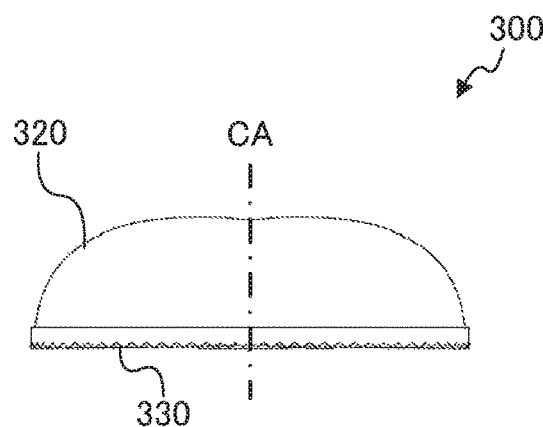
Figure 10E:
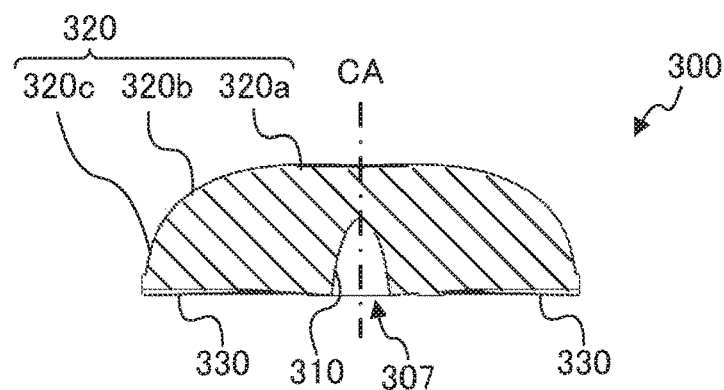

FIGS. 9 to 10E illustrate a configuration of light flux controlling member 300 according to Embodiment 1. FIG. 9 is a perspective view of light flux controlling member 300 as viewed from the rear side (substrate 210 side). FIG. 10A is a plan view of light flux controlling member 300, FIG. 10B is a bottom view light flux controlling member 300, FIG. 10C is a front view of light flux controlling member 300, FIG. 10D is a left side view of light flux controlling member 300, and FIG. 10E is a sectional view taken along line A-A of FIG. 10A.

As illustrated in FIGS. 9 to 10E, light flux controlling member 300 includes incidence surface 310, emission surface 320 and a plurality of ridges 330. Note that light flux controlling member 300 may include a flange part for easily handling light flux controlling member 300. Further, light flux controlling member 300 may include a leg part configured to define a gap for dissipating the heat generated by light-emitting element 220, and to position and fix light flux controlling member 300 to substrate 210. The leg part illustrated in the drawing is formed in a columnar shape protruding from rear surface 305. A curved concave surface is provided at the side surface of the columnar shape on the side opposite to incidence surface 310 of recess 307, and the light having reached the curved concave surface through light flux controlling member 300 is emitted while being refracted and expanded.

Incidence surface 310 is an internal surface of recess 307 that is disposed at a center portion on the rear side in such a manner as to intersect central axis CA of light flux controlling member 300. Recess 307 is disposed so as to intersect optical axis OA (central axis CA of light flux controlling member 300) of light-emitting element 220. Incidence surface 310 allows a large part of the light emitted from light-emitting element 220 to enter light flux controlling member 300, while controlling the travelling direction of the light. In a cross section perpendicular to central axis CA, incidence surface 310 may have an elliptical shape or a circular shape. In the present embodiment, incidence surface 310 has an elliptical shape in a cross section perpendicular to central axis CA. In addition, in the cross section including central axis CA, incidence surface 310 is formed such that it comes closer to rear surface 305 as the distance from central axis CA increases. Incidence surface 310 is rotationally symmetrical (2-fold rotational symmetrical) about central axis CA as the rotation axis. Note that, in the following description, the "cross section perpendicular to central axis CA" is also simply referred to as "horizontal cross section".

Rear surface 305 is a flat surface that extends radially from the opening edge of recess 307 on the rear side of light flux controlling member 300.

Emission surface 320 is disposed so as to protrude from the flange part on the front side of light flux controlling member 300 (light diffusion plate 120 side). Emission surface 320 emits the light having entered light flux controlling member 300 to the outside while controlling the travelling direction of the light. Emission surface 320 is disposed so as to intersect central axis CA. In the case where surface 310 has an elliptical shape in the horizontal cross section, emission surface 320 has an elliptical shape or a circular shape in the horizontal cross section. In addition, in the case where incidence surface 310 has a circular shape in the horizontal cross section, emission surface 320 has an elliptical shape in the horizontal cross section. That is, in the horizontal cross section, at least one of incidence surface 310 and emission surface 320 have an elliptical shape. In the present embodiment, in the horizontal cross section, both incidence surface 310 and emission surface 320 have an elliptical shape. In addition, in the present embodiment, the major axis of the ellipse of incidence surface 310 in the horizontal cross section is parallel to the minor axis of the ellipse of incidence surface 310 in the horizontal cross section.

Emission surface 320 includes first emission surface 320a located in a predetermined range around central axis CA, second emission surface 320b that is continuously formed at the periphery of first emission surface 320a, and third emission surface 320c that connects second emission surface 320b and the flange part (see FIG. 10C). In the present embodiment, first emission surface 320a is a curved surface protruding rearward. It should be noted that, in the case where emission surface 320 has an elliptical shape in the horizontal cross section, first emission surface 320a may not be a curved surface protruding rearward in the cross-section along the minor axis. The degree of the rearward protrusion is adjusted based on the arrangement (pitch) of light-emitting devices 200 in the direction along the minor axis. Second emission surface 320b is a smooth curved surface protruding frontward and is located at the periphery of first emission surface 320a. Second emission surface 320b has an elliptical annular protruding shape. Third emission surface 320c is a curved surface located at the periphery of second emission surface 320b. As illustrated in FIG. 10C, in the cross section including central axis CA, the cross-sectional shape of third emission surface 320c may be a straight line or a curved line.

Ridges 330 are disposed on the rear side of light flux controlling member 300. Ridges 330 reflect the light internally reflected by emission surface 320. Each ridge 330 includes first inclined surface 331, second inclined surface 332, and ridgeline 333 disposed between first inclined surface 331 and second inclined surface 332. Examples of the cross-sectional shape of ridge 330 in the direction perpendicular to ridgeline 333 include a triangular shape, a triangular shape with a chamfered apex, a semicircular shape, a trapezoidal shape including another surface between first inclined surface 331 and second inclined surface 332 and the like. In the present embodiment, the cross-sectional shape of ridge 330 in the direction perpendicular to ridgeline 333 is a triangular shape. That is, in the present embodiment, first inclined surface 331 and second inclined surface 332 are connected by ridgeline 333. In addition, ridges 330 are disposed such that ridges 330 are substantially perpendicular to central axis CA. Here, "substantially perpendicular to central axis CA" means that the angle between central axis CA and the extension of ridgeline 333 in the cross section including central axis CA falls within a range of 88 to 92°. Each ridge 330 functions as a total reflection prism.

As described above, incidence surface 310 has an elliptical shape in the horizontal cross section. At least one of ridges 330 is disposed outside recess 307 in the minor axis direction of the ellipse so as to extend along the minor axis direction. Here, "along the minor axis direction" is a concept including not only the case where ridge 330 is parallel to the minor axis of ridgeline 333, but also the case where the angle between the extension of the minor axis and the extension of ridgeline 333 of ridge 330 falls within a range of 0 to 5°. In the present embodiment, ridges 330 are radially disposed around central axis CA at the outer edge on the rear side of light flux controlling member 300. That is, in the present embodiment, rear surface 305 is disposed so as to surround recess 307, and ridges 330 are disposed so as to surround rear surface 305. Here, "ridges 330 are radially disposed around central axis CA" means that ridges 330 are disposed such that the extensions of ridgelines 333 intersect central axis CA.

In addition, in the case where emission surface 320 has an elliptical shape in the horizontal cross section, at least one of ridges 330 is disposed outside recess 307 in the major axis direction of the ellipse so as to extend along the major axis direction. Here, "along the major axis direction" is a concept including not only the case where ridgeline 333 of ridge 330 is parallel to the major axis, but also the case where the angle between the extension of the major axis and the extension of ridgeline 333 of ridge 330 falls within a range of 0 to 5°. In the present embodiment, ridges 330 are radially disposed around central axis CA at the outer edge on the rear side of light flux controlling member 300. That is, rear surface 305 is disposed so as to surround recess 307, and ridges 330 are disposed so as to surround rear surface 305.

Figure 11:
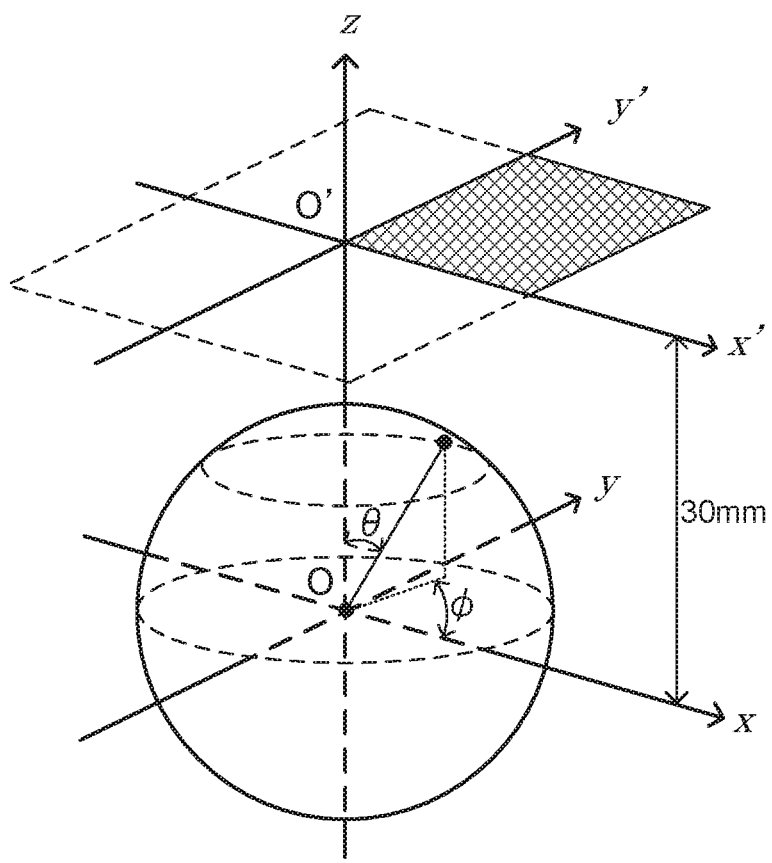
FIG. 11 is a diagram for describing a simulation condition.

Simulation of Light Distribution Characteristics of Light Flux Controlling Member Simulations for the light distribution characteristics of light flux controlling member 300 of the embodiment of the present invention were conducted. FIG. 11 is a diagram for describing a simulation condition.

As illustrated in FIG. 11, it is assumed that light beams are emitted at angles ($\theta$, $\varphi$) from origin O. Angle $\theta$ is the angle of the light beam with respect to the z axis. Angle $\varphi$ is the angle of the light beam with respect to the x axis in the first quadrant of the xy-plane. It is assumed that the light-emitting element is disposed such that the light-emitting surface of the light-emitting element is aligned with the xy-plane. It is assumed that the light flux controlling member is disposed on the xy-plane such that the central axis CA is aligned with the z axis, that the minor axis of the ellipse of the emission surface in the horizontal cross section is parallel to the x axis, and that the major axis of the ellipse of the emission surface in the horizontal cross section is parallel to the y axis. In addition, it is assumed that the light flux controlling member is disposed such that the lower end of the incidence surface is located at a position 0.03 mm from the xy-plane. The maximum outer diameter of the emission surface of the light flux controlling member is 21.0 mm, and the maximum outer diameter of the incidence surface is 4.5 mm, and, the maximum height thereof (the height from the rear surface of the light flux controlling member) is 6.35 mm. In addition, it is assumed that a surface (x'y' surface) that is parallel to the xy-plane and is located at 30 mm from the xy-plane in the z-axis direction is the illumination target surface.

In the simulation, in the case where angle $\theta$ ($\theta=20°$, 30°, 40°, 45°, 50°, 60°, 70° or 80°) was changed with angle $\theta$ ($\varphi=45°$), the positions in the illumination target surface where light beams that were incident on the incidence surface from the optical element after internally reflected by the emission surface were examined.

Figure 12A:
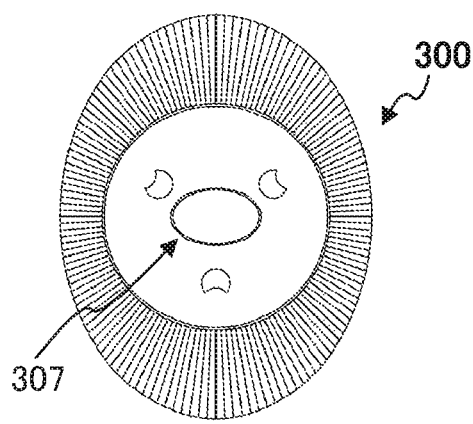
FIGS. 12A, 12B, 12C, 12D, 12E and 12F illustrate a configurations of three different light flux controlling members used for the simulation.
Figure 12B:
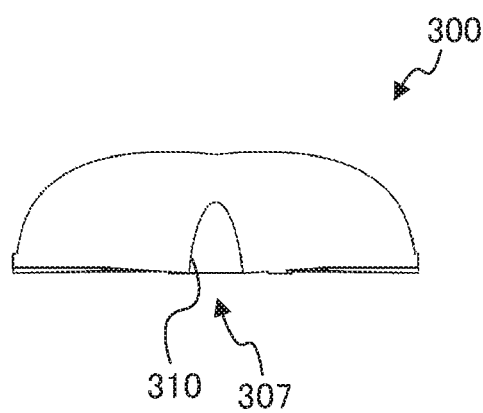
Figure 12C:
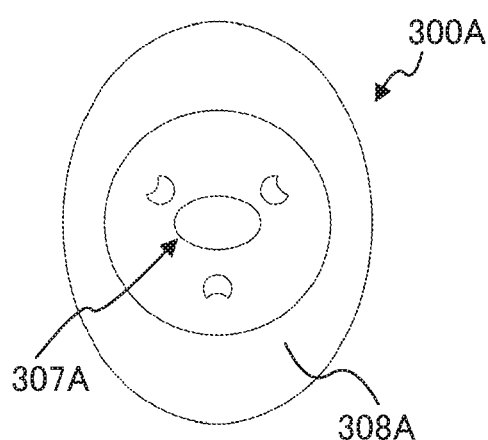
Figure 12D:
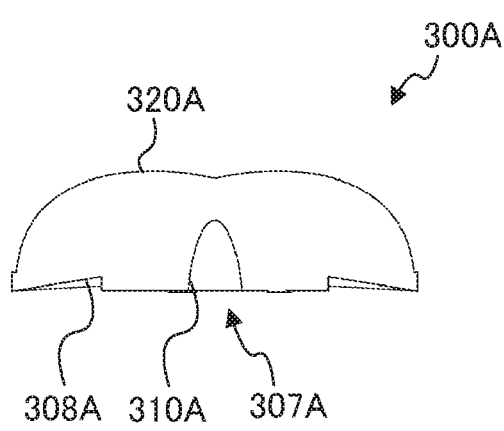
Figure 12E:
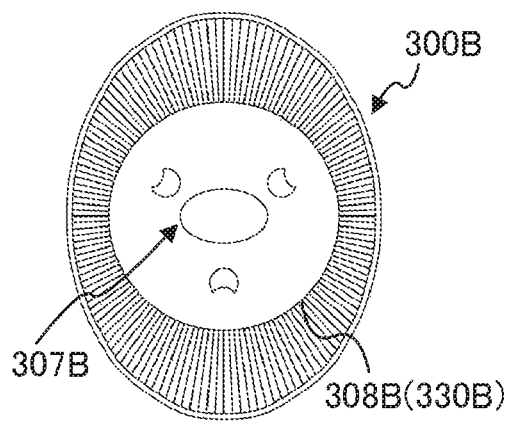
Figure 12F:
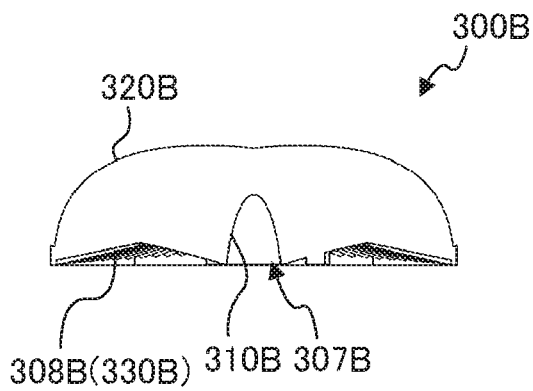

FIGS. 12A to 12F illustrate configurations of three different light flux controlling members used for the simulation. FIGS. 12A, 12C and 12E are bottom views of the light flux controlling member, and FIGS. 12B, 12D and 12F are cross sectional views including the central axis.

The light flux controlling member illustrated in FIGS. 12A and 12B is light flux controlling member 300 according to the present embodiment. The light flux controlling member illustrated in FIGS. 12C and 12D is light flux controlling member 300A of Comparative Example 1 in which annular groove 308A is formed on the rear side so as to surround recess 307A. The light flux controlling member illustrated in FIGS. 12E and 12F is light flux controlling member 300B of Comparative Example 2 in which annular groove 308B is formed on the rear side so as to surround recess 307B and ridges 330B are radially formed in a surface outside annular groove 308B.

Figure 13A:
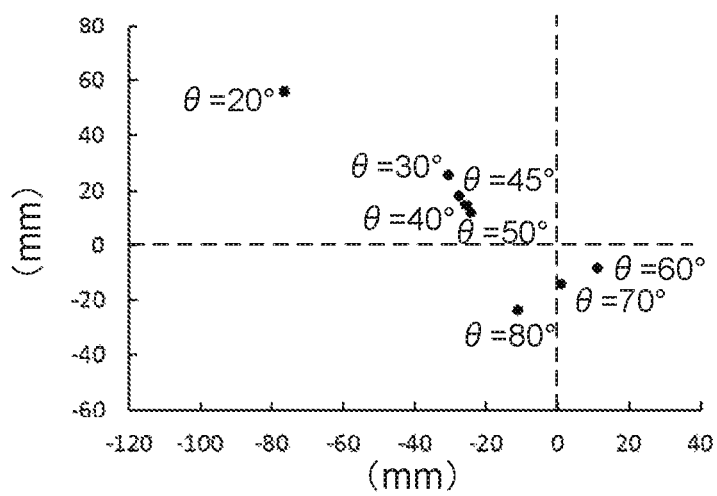
FIGS. 13A, 13B and 13C are graphs illustrating simulation results of the three different light flux controlling members.
Figure 13B:
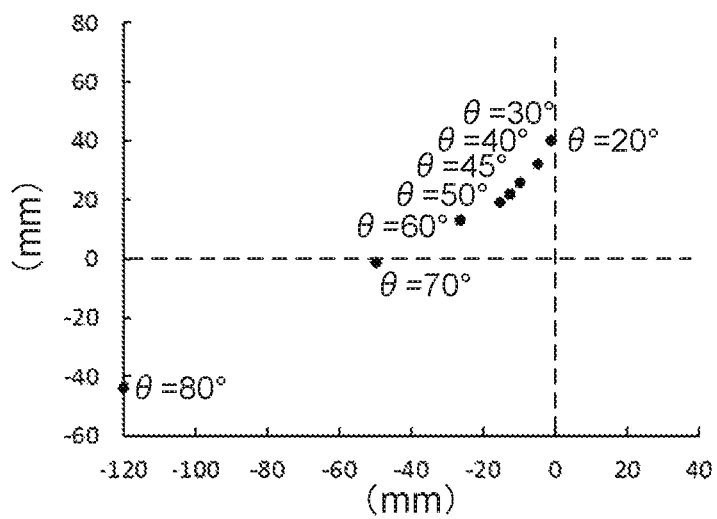
Figure 13C:
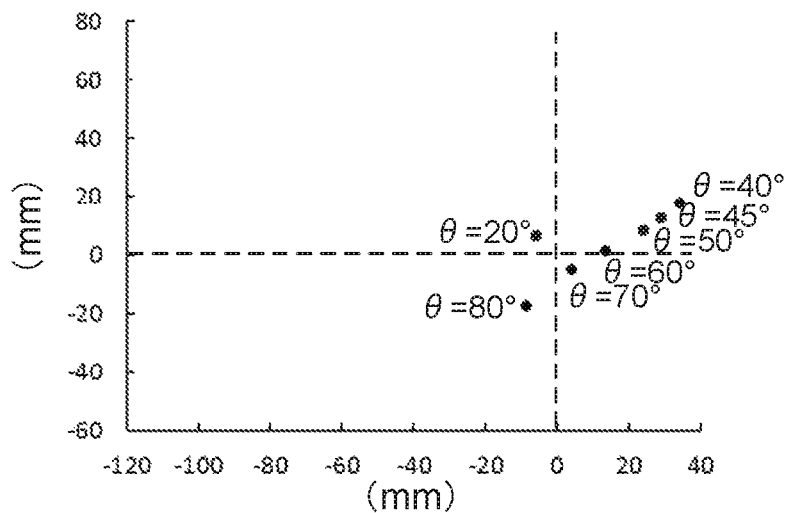

FIGS. 13A to 13C are graphs illustrating simulation results. The graphs illustrate arrival positions of light beams ($\theta=20°$, 30°, 40°, 45°, 50°, 60°, 70° or 80° with fixed $\varphi=45°$) in the illumination target surface (the x'y'-plane illustrated in FIG. 11). FIG. 13A illustrates a simulation result in light flux controlling member 300 according to the present embodiment. FIG. 13B is a simulation result in light flux controlling member 300A of Comparative Example 1. FIG. 13C is a simulation result in light flux controlling member 300B of Comparative Example 2. In FIGS. 13A to 13C, the abscissa indicates a distance (mm) from central axis CA in the X direction in the illumination target surface (x'y' surface). The ordinate indicates a distance (mm) from central axis CA in the Y direction in the illumination target surface (x'y' surface). Note that the light beam of $\varphi=45°$ and $\varphi=30°$ in Comparative Example 2 travelled farther than the set illumination target surface, and is therefore not illustrated in FIG. 13C.

As shown in FIGS. 13A to 13C, it was confirmed that in light flux controlling member 300 according to the present embodiment, light from light-emitting element 220 that is internally reflected by emission surface 320 is less condensed in comparison with light flux controlling member 300A of Comparative Example 1 and light flux controlling member 300B of Comparative Example 2. One possible reason for this is as follows. In particular, light that has been emitted from light-emitting element 220 at a large emission angle and has been internally reflected by emission surface 320 hits ridge 330 at a large angle with respect to ridge 330 and is further internally reflected by ridge 330. Then, the light is emitted out of light flux controlling member 300 while maintaining the large angle with respect to optical axis OA (see FIG. 14).

Figure 14:
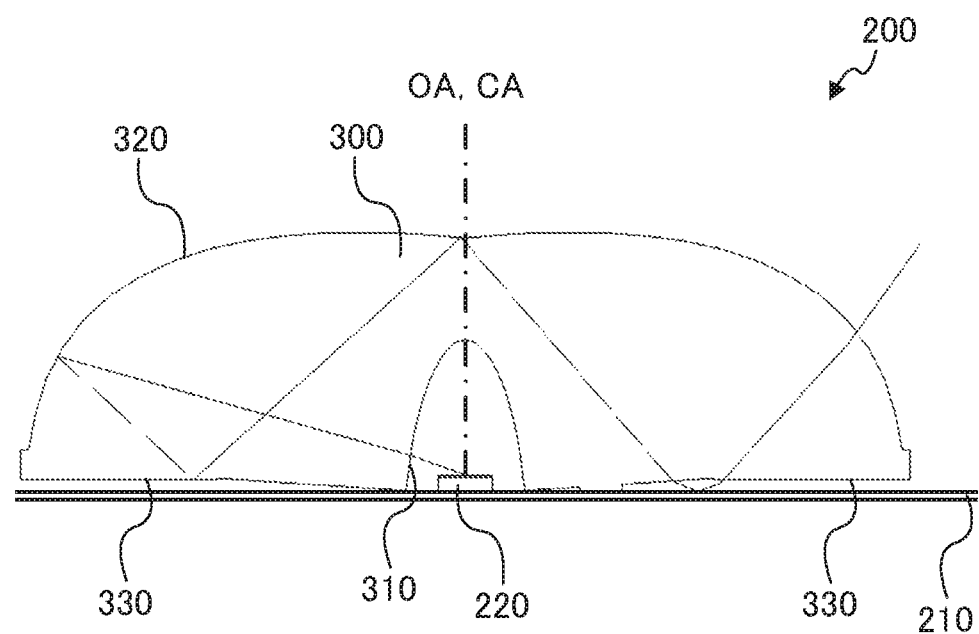
FIG. 14 is a light path diagram of the light flux controlling member according to Embodiment 1.
Figure 15A:
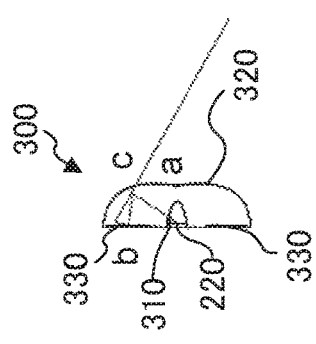
FIGS. 15A, 15B and 15C are other light path diagrams of the light flux controlling member according to Embodiment 1.
Figure 15B:
Figure 15C:
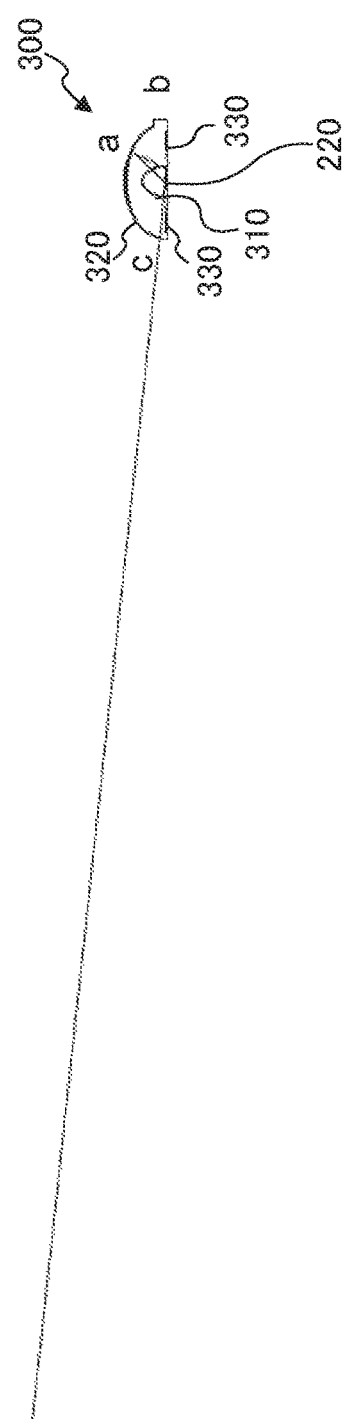
Figure 16:
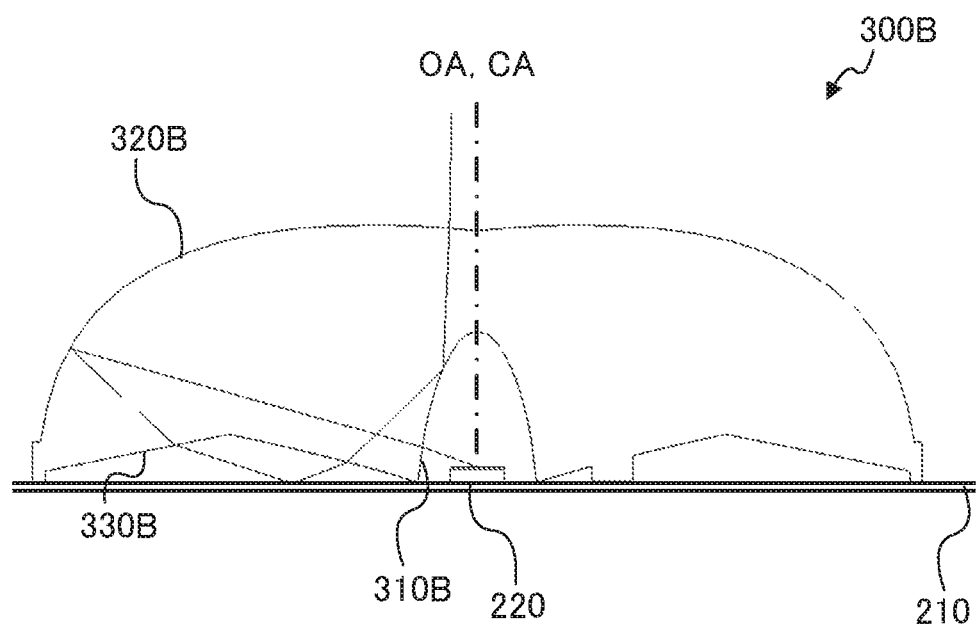
FIG. 16 is a light path diagram of a light flux controlling member of Comparative Example 2.
Figure 17A:
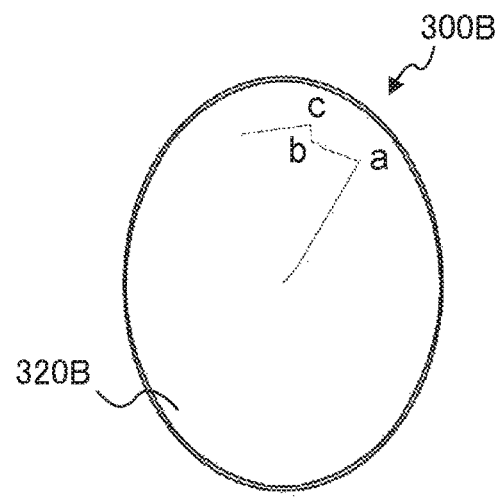
FIGS. 17A, 17B and 17C are other light path diagrams of the light flux controlling member of Comparative Example 2.
Figure 17B:
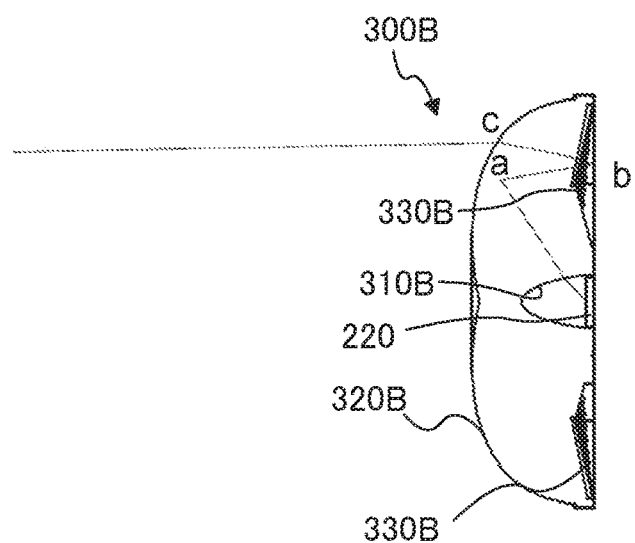
Figure 17C:
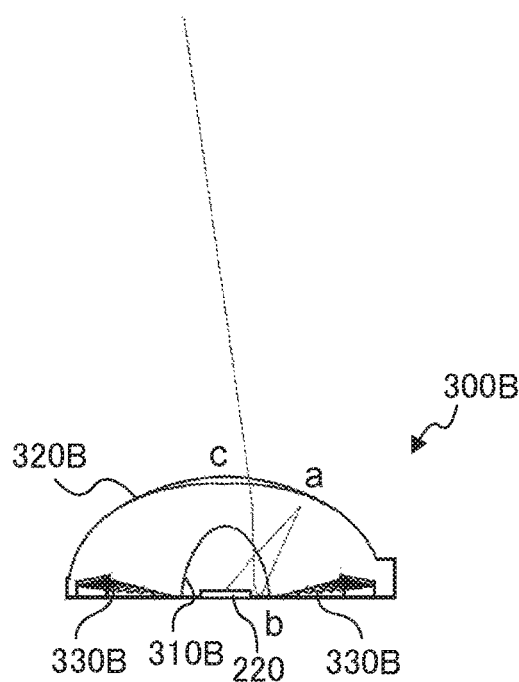

Exemplary light paths of light flux controlling member 300 according to the present embodiment and light flux controlling member 300B of Comparative Example 2 are described below. FIGS. 14 to 15C illustrate exemplary light paths of light flux controlling member 300 according to the present embodiment, and FIGS. 16 to 17C illustrate exemplary light paths of light flux controlling member 300B of Comparative Example 2. FIG. 14 illustrates light paths of the light beam of θ=70° and φ=90° in FIG. 11. That is, FIG. 14 is a light path diagram of a light beam emitted in the major axis direction of the ellipse of emission surface 320 in the horizontal cross section. FIGS. 15A to 15C illustrate light paths of a light beam of θ=44.74° and φ=50.56° in FIG. 11. FIG. 16 illustrates light paths of a light beam of θ=70° and φ=90°. Specifically, FIG. 16 is a light path diagram of a light beam emitted in the major axis direction of the ellipse of emission surface 320 in the horizontal cross section. FIGS. 17A to 17C illustrate light paths of a light beam of θ=44.74° and φ=50.56° in FIG. 11. Note that, in FIGS. 14, 15A, 15B, 16, 17A and 17B, hatching is omitted for illustration of light paths.

As illustrated in FIG. 14, in light flux controlling member 300 according to the present embodiment, some light beams of light-emitting element 220 emitted in the major axis direction of light flux controlling member 300 are entered from incidence surface 310 and are internally reflected by emission surface 320. The light beam internally reflected by emission surface 320 is again internally reflected by ridge 330. The light beam internally reflected by ridge 330 is internally reflected by emission surface 320, and is then emitted from the rear side of light flux controlling member 300. The light beam emitted from the rear side of light flux controlling member 300 again enters light flux controlling member 300 from ridge 300, and is then emitted in the direction opposite to the direction in which it is emitted from light-emitting element 220.

In addition, as illustrated in FIGS. 15A to 15C, some light beams of light-emitting element 220 hit incidence surface 310 and are internally reflected at point a of emission surface 320. The light beam internally reflected by emission surface 320 is further internally reflected at point b of the ridge such that the travelling direction is changed. The light internally reflected at point b of the ridge is emitted in the lateral direction of light flux controlling member 300 from point c of emission surface 320.

As illustrated in FIG. 16, in light flux controlling member 300B according to Comparative Example 2, some light beams of light-emitting element 220 are entered from incidence surface 310B and are internally reflected by emission surface 320B. The light beam internally reflected by emission surface 320B emitted from the rear side of light flux controlling member 300B. The light beam emitted from the rear side of light flux controlling member 300B again enters light flux controlling member 300B from ridge 330B, and is then emitted from emission surface 320B toward a part immediately above light flux controlling member 300B.

In addition, as illustrated in FIGS. 17A to 17C, some light beams of light-emitting element 220 are entered from incidence surface 310B and are internally reflected at point a of emission surface 320B. The light beam internally reflected by emission surface 320B is emitted out of light flux controlling member 300B from point b of ridge 330B of the annular groove. The light beam emitted from the rear side of light flux controlling member 300B again enters light flux controlling member 300B from the annular groove, and is then emitted toward a part immediately above light flux controlling member 300B from point c of emission surface 320B.

Effect

As described above, in surface light source device 100 according to the present embodiment, ridge 330 of light flux controlling member 300 extends in a direction substantially perpendicular to central axis CA. With this configuration, a part of the light that is emitted from light-emitting element 220 at a large angle and is internally reflected by emission surface 320 is emitted from emission surface 320 while maintaining the large emission angle, and thus luminance unevenness is less caused.

Modification

A modification of the present embodiment is described below with reference to FIGS. 18A and 18B. The surface light source device according to the modification differs from surface light source device 100 only in structures of light flux controlling members 400 and 500. In view of this, in the present embodiment, light flux controlling members 400 and 500 are mainly described. Note that the components similar to those of surface light source device 100 are denoted with the same reference numerals and the description thereof will be omitted.

Figure 18A:
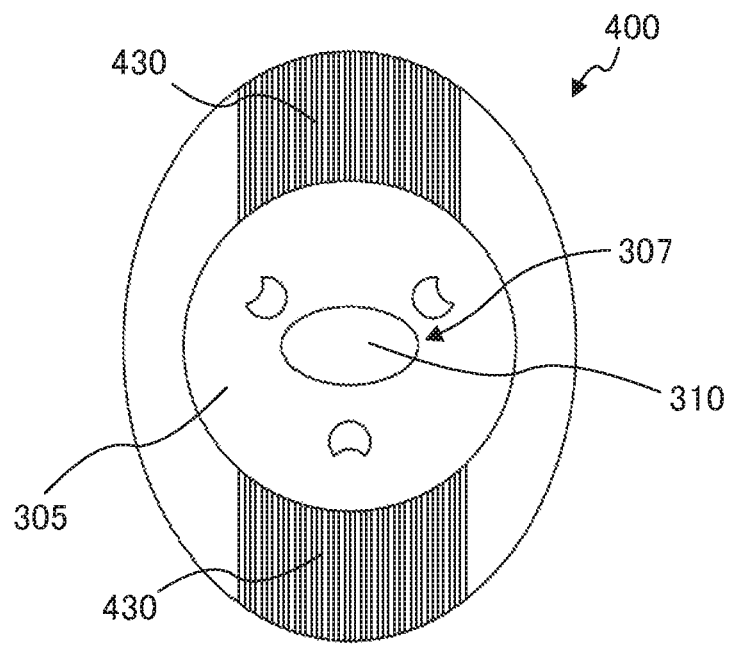
FIGS. 18A and 18B are bottom views of a light flux controlling member according to a modification of Embodiment 1.
Figure 18B:
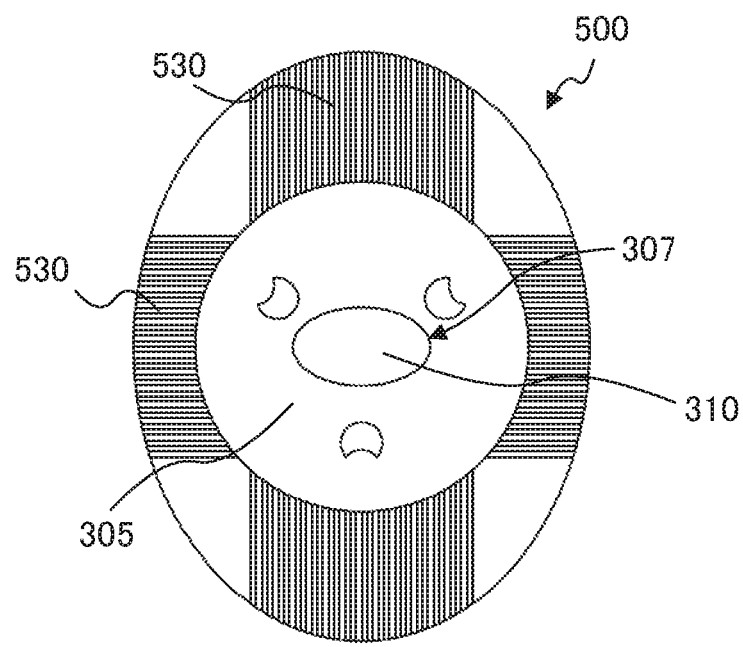

FIGS. 18A and 18B are bottom views of light flux controlling members 400 and 500 of the surface light source device according to the modification. FIG. 18A is a bottom view of light flux controlling member 400 according to the modification, and FIG. 18B is a bottom view of light flux controlling member 500 according to another modification.

As illustrated in FIG. 18A, also in light flux controlling member 400 according to the modification, the major axis of the ellipse of incidence surface 310 in the horizontal cross section is parallel to the minor axis of the ellipse of emission surface 320 in the horizontal cross section. A plurality of ridges 430 are disposed outside recess 307 in the minor axis direction of the ellipse of incidence surface 310 in the horizontal cross section so as to extend along the minor axis direction. In addition, ridges 430 are disposed outside recess 307 in the major axis direction of the ellipse of emission surface 320 in the horizontal cross section so as to extend along the major axis direction. To be more specific, all ridges 330 are disposed so as to be parallel to the minor axis of the ellipse of incidence surface 310 in the horizontal cross section and the major axis of the ellipse of emission surface 320 in the horizontal cross section. In addition, ridges 430 are formed only in a region located on a side of incidence surface 310 in the minor axis direction of the ellipse (in the major axis direction of the ellipse of emission surface 320 in the horizontal cross section) of incidence surface 310 in the horizontal cross section at an outer edge on the rear side of light flux controlling member 400.

As illustrated in FIG. 18B, also in light flux controlling member 500 according to another modification, the major axis of the ellipse of incidence surface 310 in the horizontal cross section is parallel to the minor axis of the ellipse of incidence surface 310 in the horizontal cross section. A plurality of ridges 530 are disposed outside recess 307 in the minor axis direction and the major axis direction of the ellipse of incidence surface 310 in the horizontal cross section so as to extend along the minor axis direction and the major axis direction. In addition, ridges 530 are disposed outside recess 307 in the minor axis direction and the major axis direction of the ellipse of emission surface 320 in the horizontal cross section, so as to extend along the major axis direction and the major axis direction. To be more specific, all ridges 530 are disposed so as to be parallel not only to the minor axis of the ellipse of incidence surface 310 in the horizontal cross section and the major axis of the ellipse of emission surface 320 in the horizontal cross section, but also to the major axis of the ellipse of incidence surface 310 in the horizontal cross section and the minor axis of the ellipse of emission surface 320 in the horizontal cross section. In addition, ridges 530 are formed only in a region located on a side of incidence surface 310 in the minor axis direction of the ellipse of incidence surface 310 in the horizontal cross section (in the major axis direction of the ellipse of emission surface 320 in the horizontal cross section) and a region located on a side of incidence surface 310 in the major axis direction of the ellipse of incidence surface 310 in the horizontal cross section (in the minor axis direction of the ellipse of emission surface 320 in the horizontal cross section) at an outer edge on the rear side of light flux controlling member 500.

Embodiment 2

A surface light source device according to Embodiment 2 differs from surface light source device 100 according to Embodiment 1 only in the configuration of light-emitting device 600. In view of this, the components similar to those of surface light source device 100 are denoted with the same reference numerals and the description thereof will be omitted.

Figure 19A:
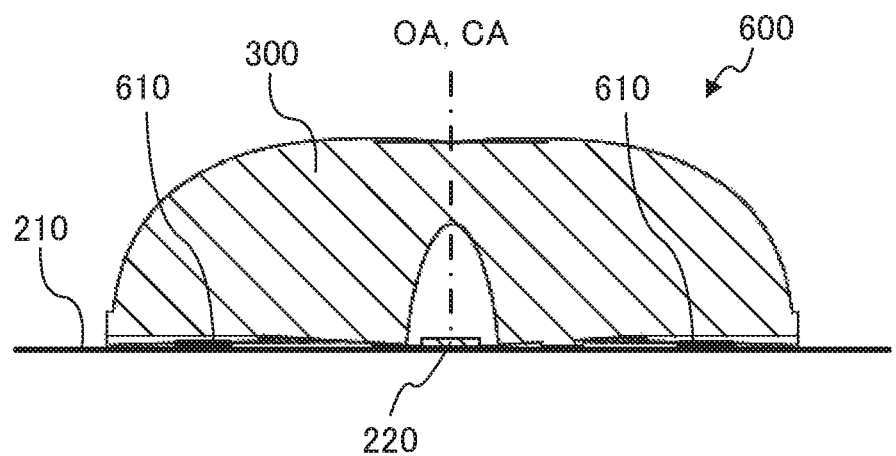
FIG. 19A is a partially enlarged sectional view of a surface light source device according to Embodiment 2.
Figure 19B:
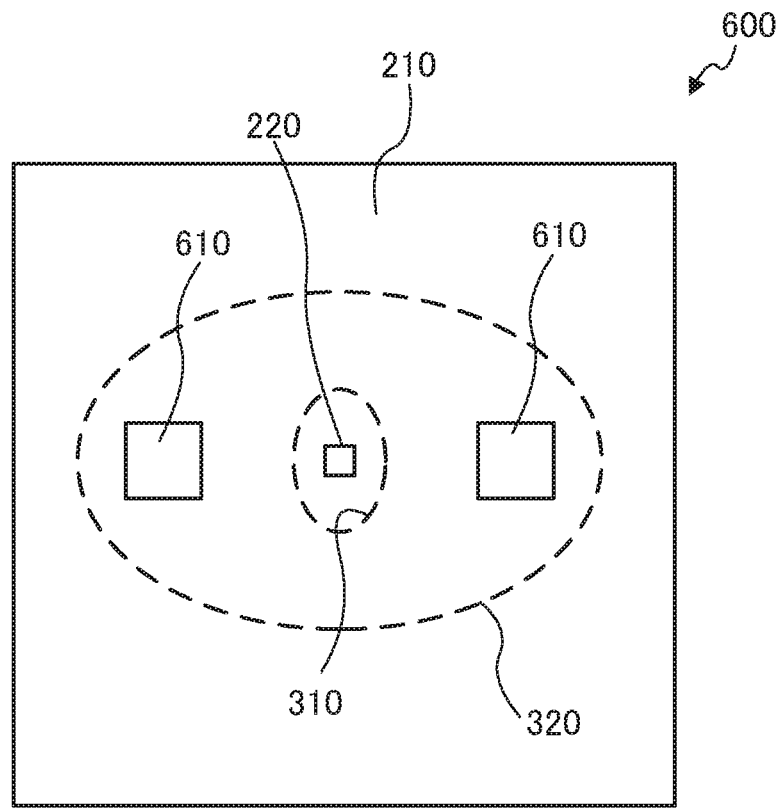
FIG. 19B is a diagram for describing a reflection reducing part.

FIGS. 19A and 19B illustrate a configuration of light-emitting device 600 of a surface light source device according to Embodiment 2. FIG. 19A is a partially enlarged sectional view of a light-emitting device according to Embodiment 2, and FIG. 19B is a schematic view for describing reflection reducing part 610.

As illustrated in FIGS. 19A and 19B, each light-emitting device 600 according to Embodiment 2 further includes reflection reducing part 610 in addition to substrate 210, light-emitting element 220 and light flux controlling member 300.

Reflection reducing part 610 is disposed on substrate 210. Reflection reducing part 610 reduces reflection, toward ridge 330 (light flux controlling member 300), of light from light-emitting element 220 that is internally reflected by emission surface 320 of light flux controlling member 300 and is emitted toward substrate 210 from ridge 330. The configuration of reflection reducing part 610 may be appropriately selected as long as the above-mentioned functions can be ensured. Reflection reducing part 610 may be a black-colored region disposed in a part of the surface of substrate 210, or a roughened region disposed in a part of substrate 210. In the present embodiment, reflection reducing part 610 is a black-colored region disposed in a part of the surface of substrate 210. Also, the shape of reflection reducing part 610 may be appropriately set as long as the above-mentioned function can be ensured. In the present embodiment, reflection reducing part 610 has a rectangular shape in plan view.

As in the present embodiment, incidence surface 310 has an elliptical shape in the horizontal cross section, and accordingly the curvature at an end portion of incidence surface 310 in the major axis direction of the ellipse is greater than the curvature at an end portion of incidence surface 310 in the minor axis direction of the ellipse. With this configuration, the light beam emitted from light-emitting element 220 is refracted such that the light beam condenses toward the minor axis of the ellipse of incidence surface 310 in the horizontal cross section. In addition, emission surface 320 also has an elliptical shape in the horizontal cross section, and is disposed such that the major axis of the ellipse of incidence surface 310 in the horizontal cross section and the minor axis of the ellipse of emission surface 320 in the horizontal cross section are parallel to each other. With this configuration, the light beam emitted from light-emitting element 220 is reflected by emission surface 320 such that the light beam condenses toward the major axis of the ellipse of emission surface 320 in the horizontal cross section. In this manner, in the case where incidence surface 310 and/or emission surface 320 has an elliptical shape in the horizontal cross section, the light beam emitted from light-emitting element 220 tends to be concentrated in a predetermined region of substrate 210. In view of this, for the purpose of reducing reflection of such collected light beams, reflection reducing part 610 is disposed on substrate 210 at a position outside recess 307 on a side in the minor axis direction of the ellipse of incidence surface 310 in the horizontal cross section in the case where incidence surface 310 has an elliptical shape in the horizontal cross section. In addition, it is disposed on substrate 210 at a position outside recess 307 on a side in the major axis direction of the ellipse of emission surface 320 in the horizontal cross section in the case where emission surface 320 has an elliptical shape in the horizontal cross section.

Effect

As described above, the surface light source device according to the present embodiment further includes reflection reducing part 610, and it is thus possible to reduce reflection of the light having reached substrate 210 while achieving the effect of Embodiment 1. As a result, the surface light source device according to the present embodiment less causes luminance unevenness.

Note that, while incidence surface 310 and emission surface 320 have elliptical shapes in the horizontal cross section in Embodiments 1 and 2, it is also possible to adopt a configuration in which incidence surface 310 has an elliptical shape in the horizontal cross section and emission surface 320 has a circular shape in the horizontal cross section. Further, it is also possible to adopt a configuration in which incidence surface 310 has a circular shape in the horizontal cross section and emission surface 320 has a circular shape in the horizontal cross section.

This application is entitled to and claims the benefit of Japanese Patent Application No. 2017-082820 filed on Apr. 19, 2017, the disclosure each of which including the specification, drawings and abstract is incorporated herein by reference in its entirety.

INDUSTRIAL APPLICABILITY

The light flux controlling member, the light-emitting device and the surface light source device of the embodiments of the present invention are applicable to, for example, a backlight of liquid crystal display apparatuses or generally-used illumination apparatuses.

REFERENCE SIGNS LIST

10 Light-emitting element
20, 30 Light flux controlling member
22 Incidence surface
24 Emission surface
26 Rear surface
32 Inclined surface
34 Surface that is approximately parallel to central axis
100 Surface light source device
107 Display member
110 Housing
112 Bottom plate
114 Top plate
120 Light diffusion plate
200, 600 Light-emitting device
210, 210B Substrate
220 Light-emitting element
300, 300A, 300B, 400, 500 Light flux controlling member
305 Rear surface
307, 307A, 307B Recess
308A, 308B Annular groove
310, 310A, 310B Incidence surface
320, 320A, 320B Emission surface
320a First emission surface
320b Second emission surface
320c Third emission surface
330, 330B, 430, 530 Ridge
331 First inclined surface
332 Second inclined surface
333 Ridgeline
610 Reflection control part
CA Central axis of light flux controlling member
OA Optical axis of light-emitting element

What is claimed is:

1. A light flux controlling member configured to control a distribution of light emitted from a light-emitting element, the light flux controlling member comprising:
   an incidence surface that is an inner surface of a recess disposed on a rear side so as to intersect a central axis of the light flux controlling member, the incidence surface being configured to allow incidence of the light emitted from the light-emitting element;
   an emission surface disposed on a front side so as to intersect the central axis, the emission surface emits, to outside, the light entered from the incidence surface; and
   a plurality of ridges disposed on the rear side, each of the plurality of ridges including a first inclined surface, a second inclined surface and a ridgeline disposed between the first inclined surface and the second inclined surface,
   wherein the plurality of ridges is disposed such that an angle between the central axis and an extension of the ridgeline falls within a range of 88 to 92° in a cross section including the central axis,
   wherein at least one of the incidence surface and the emission surface has a shape of an ellipse in a cross-section perpendicular to the central axis;
   wherein when the incidence surface has the shape of the ellipse in the cross-section, at least one of the plurality of ridges is disposed outside the recess in a direction of a minor axis of the ellipse so as to extend along the direction of the minor axis; and
   wherein when the emission surface has the shave of the ellipse in the cross-section, the at least one of the plurality of ridges is disposed outside the recess in a direction of a major axis of the ellipse so as to extend along the direction of the major axis.

2. The light flux controlling member according to claim 1,
   wherein both the incidence surface and the emission surface have the shape of the ellipse in the cross-section; and
   wherein a major axis of the ellipse of the incidence surface in the cross-section is parallel to a minor axis of the ellipse of the emission surface in the cross-section.

3. The light flux controlling member according to claim 1, wherein the plurality of ridges is radially disposed about the central axis in an outer edge portion on the rear side of the light flux controlling member.

4. A light-emitting device comprising:
   a substrate;
   a light-emitting element disposed on the substrate; and
   the light flux controlling member according to claim 1 that is disposed on the substrate.

5. The light-emitting device according to claim 4, further comprising a reflection reducing part configured to reduce reflection of light of the light-emitting element that is internally reflected by the emission surface and is emitted from the rear side of the light flux controlling member,
   wherein at least one of the incidence surface and the emission surface has the shape of the ellipse in the cross-section perpendicular to the central axis;
   wherein when the incidence surface has the shape of the ellipse in the cross-section, the reflection reducing part is disposed on the substrate at a position outside the recess in the direction of the minor axis of the ellipse; and
   wherein when the emission surface has the shape of the ellipse in the cross-section, the reflection reducing part is disposed on the substrate at a position outside the recess in the direction of the major axis of the ellipse.

6. The surface light source device comprising:
   the light-emitting device according to claim 4; and
   a light diffusion member configured to allow light emitted from the light-emitting device to pass through the light diffusion member while diffusing the light.

7. A display device comprising:
   the surface light source device according to claim 6; and
   a display member configured to be irradiated with light emitted from the surface light source device.

* * * * *